United States Patent [19]

Zaltieri

[11] 4,000,804

[45] Jan. 4, 1977

[54] ARRANGEMENT FOR TRANSFERRING A RIBBON FROM A FEED SPOOL TO A TAKE-UP SPOOL

[75] Inventor: Adriano Zaltieri, Ivrea (Turin), Italy

[73] Assignee: Ing. C. Olivetti & C., S.p.A., Ivrea (Turin), Italy

[22] Filed: Feb. 6, 1976

[21] Appl. No.: 655,645

[30] Foreign Application Priority Data

Feb. 10, 1975 Italy ................................ 67342/75

[52] U.S. Cl. ................................ 197/151; 197/161; 242/75.51; 318/7

[51] Int. Cl.[2] .................. B41J 33/34; B41J 33/512; H02P 7/68

[58] Field of Search ... 101/336; 197/151, 160–165; 226/195; 242/75.51; 318/6, 7, 432

[56] References Cited

UNITED STATES PATENTS

| | | | |
|---|---|---|---|
| 3,291,043 | 12/1966 | Bernard | 197/151 X |
| 3,759,456 | 9/1973 | Moneagle et al. | 242/57.1 |
| 3,836,831 | 9/1974 | Van Heelsbergen | 318/7 |
| 3,863,117 | 1/1975 | Paschetto | 318/7 |
| 3,889,893 | 6/1975 | Silverman et al. | 242/57.1 |

FOREIGN PATENTS OR APPLICATIONS

| | | | |
|---|---|---|---|
| 2,064,422 | 7/1972 | Germany | 318/342 |
| 2,163,469 | 7/1969 | Germany | 197/161 |
| 2,460,004 | 7/1975 | Germany | 197/161 |

*Primary Examiner*—Edgar S. Burr
*Assistant Examiner*—Paul T. Sewell
*Attorney, Agent, or Firm*—I. J. Schaefer

[57] ABSTRACT

An arrangement for transferring a ribbon from a feed spool to a take-up spool comprises a pair of electric motors each one connected to a corresponding spool for the rotation thereof. The motor connected to the take-up spool is supplied by a constant current generator so as to wind-up said ribbon with a minimum and substantially constant torque. The motor connected to the feed spool is supplied by a constant voltage generator so as to keep said ribbon constantly taut during the transferring thereof. A changeover device alternates the function of the two spools when the ribbon is fully wound on the take-up spool.

15 Claims, 4 Drawing Figures

ARRANGEMENT FOR TRANSFERRING A RIBBON FROM A FEED SPOOL TO A TAKE-UP SPOOL

BACKGROUND OF THE INVENTION

1. Field of the Invention

The present invention relates to an arrangement for transferring a ribbon from a feed spool to a take-up spool wherein each spool is connected to a corresponding electric motor. The ribbon may be the inked ribbon of a printer, although use of the invention is not thus limited.

2. Description of the Prior Art

A transfer arrangement of the aforesaid type is known wherein, in order to keep the ribbon always taut along the whole of its path, a motor is energised in such manner as to provide the take-up spool with the driving torque necessary for the transporting action, while the other motor is energised in such manner as to provide the corresponding feed spool with a resisting or opposing torque. This arrangement, however, has the disadvantage that the motor of the take-up spool has to overcome not only the passive resistances due to the friction of the ribbon along its path but also the resistance provided by the other motor. This entails overdimensioning of the motor for the take-up spool and, therefore, an arrangement of this kind becomes rather bulky and costly.

SUMMARY OF THE INVENTION

The object of the present invention is to provide a ribbon transferring arrangement which enables the ribbon to be kept taut along its path and which is, moreover, not very costly and of limited dimensions.

According to the present invention, there is provided an arrangement for transferring a ribbon from a feed spool to a take-up spool wherein each of the spools is coupled to an electric motor, a constant voltage generator supplying the motor connected to the feed spool so as to drive the feed spool in the unwinding direction at a speed determined by the voltage supplied by the voltage generator and a constant current generator supplying the motor connected to the take-up spool so as to establish a winding-up torque on the take-up spool determined by the current supplied by the current generator.

It is to be understood that the constant voltage and current generators provide a voltage and a current which are stabilized at substantially constant value when the operation of the arrangement is considered on a short time scale. On a longer time scale, it may be desired to vary the values at which the voltage and current are stabilized, in order to compensate for the varying effective diameters of the spools, as explained below. If this is done, it remains true that, at any given time, the generators are acting as constant voltage and constant current generators.

BRIEF DESCRIPTION OF THE DRAWINGS

The invention will be described in more detail, by way of example, with reference to the accompanying drawings, in which.

DESCRIPTION OF A PREFERRED EMBODIMENT OF THE INVENTION

Figure 1:
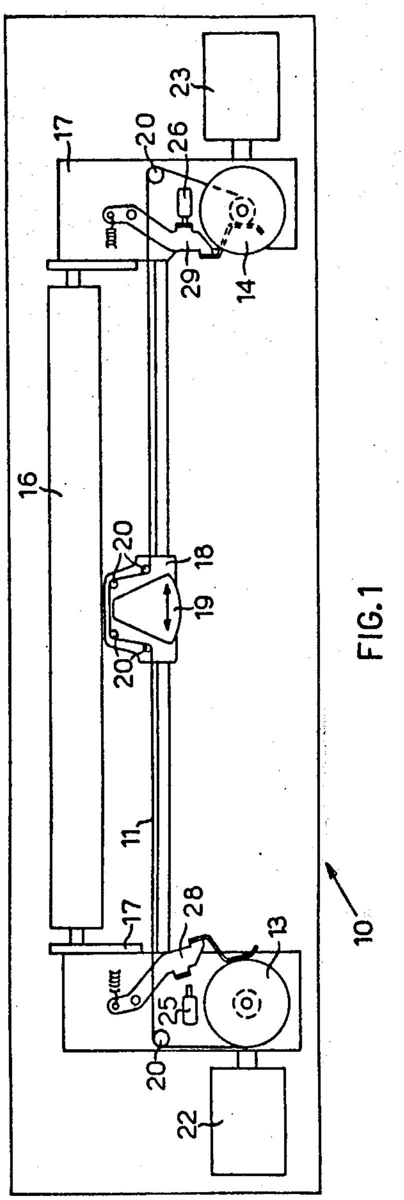
FIG. 1 is a diagrammatic view of an office machine incorporating an arrangement embodying the invention.

Referring to FIG. 1, an arrangement embodying the invention is shown in an office machine 10 of known type, such as, for example, a data terminal or a teleprinter, for transporting an inked ribbon 11 from one to the other of two spools 13 and 14, the two spools interchanging their functions from time to time. The office machine shown here comprises a platen 16 rotatable in a supporting frame 17 and parallel to which there shifts a carriage 18. This carriage 18 carries a printing head 19 of known type, for example of the type described in the U.S. patent application Ser. No. 558,292 filed Mar. 14, 1975 and assigned to Ing.C.Olivetti & C., S.p.A.. A series of rollers 20 mounted partly on the carriage 18 and partly on the frame 17 guide the inked ribbon 11 in front of the printing point of the head 19.

The spools 13 and 14 are mounted rotatably on the frame 17 and are connected through reducing gears, not shown in the drawings, to two direct-current electric motors 22 and 23, respectively, also mounted on the frame 17. The two motors 22 and 23 are driven by the electric circuit shown in FIGS. 2, 3 and 4 under the control of two microswitches 25 and 26 actuated by two sensing levers 28 and 29, respectively. The levers 28 and 29, in turn, are pivoted on the frame 17 and co-operate with the outer turns of the ribbon 11 wound on the spools 13 and 14 to detect when the ribbon is about to be unwound completely from the corresponding spool.

The electric motors 22 and 23 are reversible, the direction of rotation depending on the sense of the supply voltage. Moreover, the reducing gears disposed between the motors 22, 23 and the spools 13, 14 have such a high ratio that it is not possible practically speaking to cause either motor to rotate by applying tension to the ribbon 11.

Figure 2:
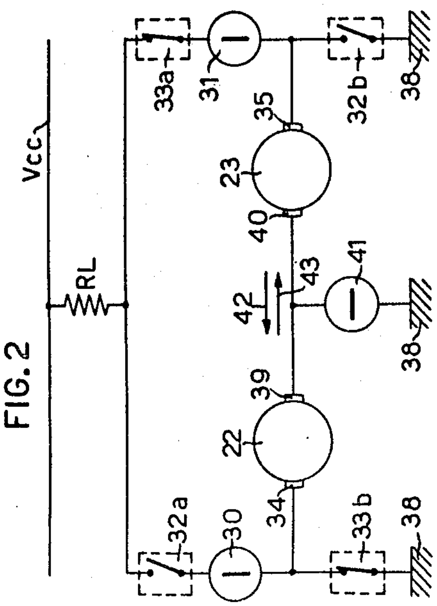
FIG. 2 is a general diagram illustrating the electric circuit of the arrangement embodying the invention.

According to the general diagram of FIG. 2, the electric circuit driving the motors 22 and 23 comprises a pair of constant current generators 30 and 31 each having one terminal connected to a source of potential Vcc by way of respective switches **32*a* and 33*a* and a limiting resistor RL. The other terminals are connected to respective first terminals 34 and 35 of the motors 22 and 23**.

The terminals 34 and 35 are also connected by way of respective switches **33*b* and 32*b* to a common ground or earth 38. The second terminals 39 and 40 of the motors 22 and 23 are connected together to one terminal of a constant voltage generator 41**, which has its other terminal connected to earth.

The switches **32*a*, 32*b* and 33*a*, 33*b* are actuated so that they are always open or closed in pairs, such that if the switches 32*a* and 32*b* are open, the switches 33*a* and 33*b*** are closed, and vice versa.

In this way, in a first working condition, with the switches **33*a* and 33*b* closed and the switches 32*a* and 32*b* open (as illustrated), the supply current flows into the motors 22 and 23 from right to left in the direction of the arrow 42, causing them both to rotate in the same direction, for example in the clockwise direction. In a second working condition, when the switches 32*a* and 32*b* are closed and the switches 33*a* and 33*b* are open, the supply current flows into the motors 22 and 23 from left to right, as indicated by the arrow 43**, causing them in this way to rotate both, for example, in the anticlockwise direction.

In the first working condition, the motor 22 is supplied by the generator 41 at a substantially constant voltage, while the motor 23 is supplied with constant current by the generator 31. The motor 22 then causes the feed spool 13 (FIG. 1) to rotate at a substantially constant angular velocity, while the motor 23 provides the take-up spool 14 with a substantially constant torque, winding thereon all the ribbon 11 unwound from the spool 13.

In the second working condition, that is with the switches 32*a* and 32*b* (FIG. 2) closed and the switches 33*a* and 33*b* open, the motor 22 is supplied with constant current by the generator 30 and controls the spool 13, which in this case acts as the take-up spool, while the motor 23 is supplied from the left with a voltage which is kept constant by the same generator 41 and controls the spool 14, which in this case acts as the feed spool. The passage from the first to the second working condition is made on actuation of the microswitches 25 and 26, in the manner described later on with the aid of the diagram of FIG. 3.

During the transfer, the winding force, or pull, of the ribbon 11 remains accurately controlled. More particularly, it varies between a minimum value, when the whole of the ribbon 11 is wound on the take-up spool 14 or 13, respectively, and a maximum value, when the whole of the ribbon 11 is wound on the feed spool 13 or 14, respectively. In practice, by choosing the diameter of the cores of the two spools 13 and 14 in proportion to the length of the ribbon 11, this variation can readily be limited to a ratio of 1 : 3. The minimum value will be such, however, as to be greater than the frictional resistances present along the path of the ribbon 11.

Because of the pull always applied to the ribbon 11, the formation of loops or slackening during the transfer of the ribbon from one spool to the other is prevented. It is clear that the speed at which the ribbon 11 runs remains controlled and varies in the same ratio as that in which the corresponding pull varies, in dependence upon the amount of ribbon 11 wound on the two spools 13 and 14.

Figure 3:
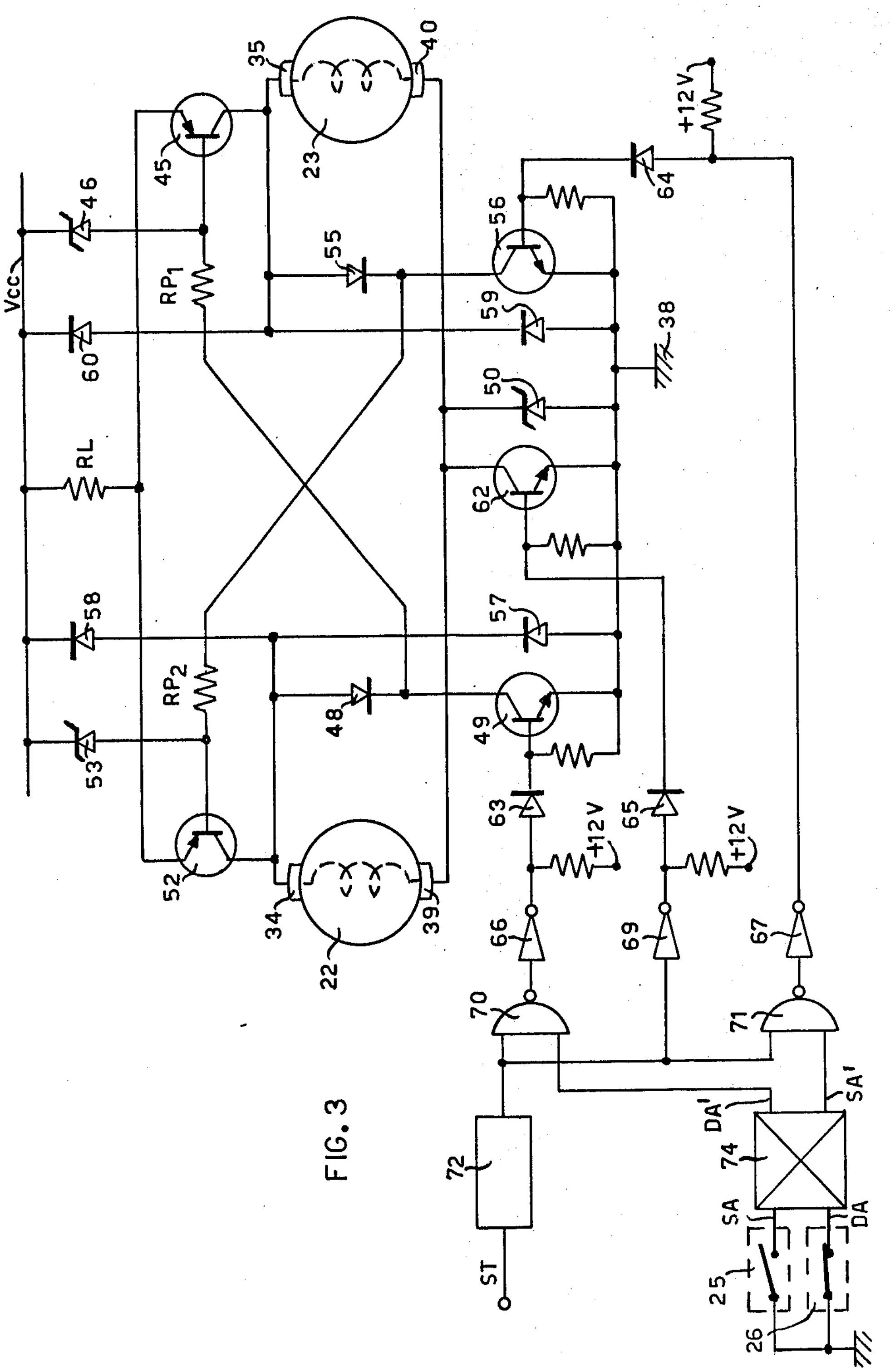
FIG. 3 is a diagram illustrating a preferred embodiment of the circuit of FIG. 2.

Referring to FIG. 3, the functions of the constant current generators 30 and 31 (FIG. 2) and of the switches 32*a* and 33*a* are performed by two transistors 52 and 45, respectively, (FIG. 3). The terminal 35 of the motor 23 is connected to the collector of the transistor 45 of P-N-P type, which has its emitter connected to the supply voltage Vcc through the resistor RL and its base connected to the voltage Vcc through a reverse biased Zener diode 46. The terminal 34 of the motor 22 is connected to the collector of the transistor 52 of P-N-P type, which has its emitter connected to the voltage Vcc through the resistor RL and its base connected to the same supply Vcc through another reverse biased Zener diode 53. The constant voltage generator 41 (FIG. 2) is constituted by a Zener diode 50 (FIG. 3) which connects the terminals 39 and 40 of the two motors 22 and 23 to earth 38.

The function of the two switches 32*b* and 33*b* (FIG. 2) is performed by two transistors 56 and 49, respectively (FIG. 3). The terminal 34 of the left-hand motor 22 is connected by way of a directly biased diode 48 to the collector of the transistor 49 of N-P-N type, which has its emitter connected to earth 38 and its base connected to a reference potential. A biasing resistor $RP_1$ is connected between the base of the transistor 45 and the collector of the transistor 49. The terminal 35 of the right-hand motor 23 is connected by way of a directly biased diode 55 to the collector of the transistor 56 of N-P-N type, which has its emitter connected to earth 38 and its base connected to a reference potential. A biasing resistor $RP_2$ is connected between the base of the transistor 52 and the collector of the transistor 56.

In order to reduce the times of the changeovers from one working condition to the other and protect the transistors 45, 52, 49, 56 during these changeovers, a series of diodes and another transistor are provided. In parallel with the diode 48 and the transistor 49, a reverse biased diode 57 is arranged between the terminal 34 and earth 38 and, in parallel with the transistor 52 and the resistor RL, a diode 58, also reverse biased, is arranged between the terminal 34 and the voltage Vcc. Moreover, in parallel with the diode 55 and the transistor 56, a reverse biased diode 59 is arranged between the terminal 35 and earth 38 and, in parallel with the transistor 45 and the resistor RL, a diode 60, also reverse biased, is arranged between the terminal 35 and the voltage Vcc. Finally, in parallel with the Zener diode 50, with its collector connected to the terminals 39 and 40 and its emitter connected to earth 38, there is arranged a transistor 62 of N-P-N type which has its base connected to a reference potential.

For their control, the bases of the transistors 49, 56 and 62 are connected by way of three diodes 63, 64 and 65, respectively, which are all directly biased, to the outputs of three power inverters 66, 67 and 69, respectively. The inputs of the inverters 66 and 67 are connected to the outputs of two NAND gates 70 and 71, respectively, while the input of the inverter 69 is connected to the output of a monostable circuit 72, which has as its input a starting signal ST supplied by the electronic controller (not shown in the drawing) which commands the printing head.

The inputs of the NAND gates 70 and 71 are constituted by the outputs DA' and SA', respectively, of a flip-flop 74 of set-reset type, which has its inputs connected to the outputs SA and DA of the microswitches 25 and 26. The other input of the gates 70 and 71 is constituted by the output of the monostable circuit 72.

Under rest or inoperative conditions, let it be assumed that the carriage 18 (FIG. 1) of the printer is shifted fully to the left and that the inked ribbon 11 is wound completely on the left-hand spool 13. The microswitch 25 is open and the microswitch 26 is closed. The logical levels of the outputs are respectively SA = 0 and DA = 1 and the outputs of the flip-flop 74 are SA' = 0 and DA' = 1. The signal ST, moreover, is at logical zero level and, therefore, the output of the monostable circuit is also at zero. This causes the outputs of the inverters 66 and 67 to be at logical zero level, while the output of the inverter 69 is at level 1. In this way, the transistors 49 and 56 are blocked and the motors 22 and 23 are stationary. Also during the printing phase, when the head 19 moves from left to right, the signal ST remains at zero and the motors 22 and 23 remain stationary.

When a carriage-return signal is sent to the carriage 18, the signal ST is brought to logical 1 level and the monostable circuit 72 brings its output to level 1 for a predetermined time, for example 200 – 300 msec. Consequently, the output signal from the inverter 66 goes to 1 and makes the transistor 49 conducting, while the output signal from the inverter 67 remains at zero, leaving the transistor 56 blocked. The output signal from the inverter 69 also goes to zero, thus leaving the transistor 62 blocked.

Figure 4:
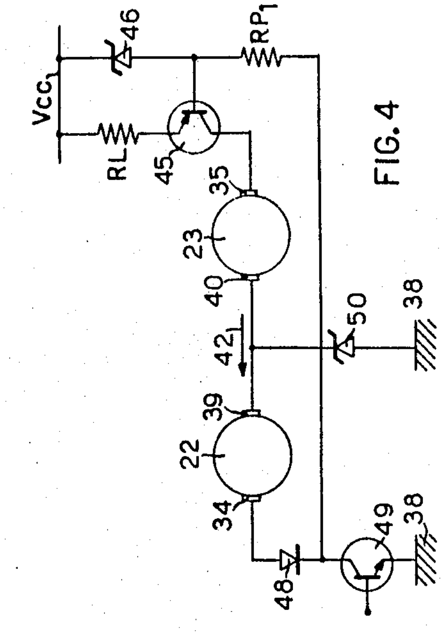
FIG. 4 is an electric circuit diagram illustrating a detail of the circuit of FIG. 3.

With the supply voltage Vcc at a positive potential, for example +38V, and with the transistor 49 in the conducting state, the right-hand motor 23 is supplied with the constant current which is passed by the transistor 45, while the left-hand motor 22 is supplied at a constant voltage which is kept so by the Zener diode 50 (see also FIG. 4). Both the motors 22 and 23 rotate in the same direction, which is such as to cause the spools 13 and 14 to rotate clockwise (FIG. 1) so as to wind the ribbon 11 on the spool 14.

When the output signal from the monostable circuit 72 returns to zero, the output signal from the inverter 66 also returns to zero, bringing the transistor 49 back to the blocked state, while the output signal from the inverter 69, returning to 1, brings the transistor 62 back to the conducting state. In this way, the two motors 22 and 23 stop immediately and the voltages due to the inductances of the circuit are discharged through the diodes 57 and 60. The conductive transistor 62 short-circuits the Zener diode 50.

When the left-hand spool 13 (FIG. 1) is almost empty, the microswitch 25 is actuated by the lever 28 and the flip-flop 74 (FIG. 3) is changed over and its outputs are brought to the logical values SA' = 1, DA' = 0. In this second condition, when the signal ST goes to level 1 and the output signal from the monostable circuit 72 consequently goes to level 1, the output signal from the inverter 67 also goes to 1, rendering the transistor 56 conducting, while the output signals from the inverters 66 and 69 are at level zero.

Therefore, the left-hand motor 22 connected to the spool 13 which now acts as the take-up spool is fed with the constant current supplied to it by the transistor 52, while the right-hand motor 23, connected to the spool 14 which now acts as the feed spool, is supplied at a constant voltage which is kept so by the same Zener diode 50. Moreover, both the motors 22 and 23 and the spools 13 and 14 rotate in the opposite direction to that in which they were rotating in the first working condition. Again, when the output signal from the monostable circuit 72 returns to zero, the two motors 22 and 23 stop immediately and the voltages due to the inductances of the circuit are discharged through the diodes 58 and 59.

In this way, the inked ribbon 11 is fed and transferred from one spool to the other only during the stage of return of the printing head 19 to the beginning of the printing line, when it does not print. This causes the printing to be much clearer, above all in the case of wire-type heads.

It is clear that various modifications may be made without departing from the scope of the claims. In particular, the voltage and/or current of the two motors 22 and 23 may be varied as a function of the amounts of ribbon wound on a spool, for the purpose of rendering the speed of transfer and/or the pull, respectively of the ribbon 11 more regular. This can be achieved, for example, by detection of the speed of transfer of the motor supplied at constant current and suitable correction of the two reference voltages supplied by the Zener diodes to the constant current generator and the constant voltage generator in any known manner.

Time constants can be built into the circuit to ensure that the motor driving the feed spool is de-energised slightly in advance of the motor driving the take-up spool. This will ensure that no slack develops in the ribbon when the motors stop. The transistor 62 can be rendered conductive just before the other transistors are rendered non-conductive.

What I claim is:

1. An arrangement for transferring a ribbon from a feed spool to a take-up spool comprising a first and a second direct current electric motors connected to said feed spool and to said take-up spool, respectively, for effecting the rotation thereof, and means for both causing one of the two motors to wind-up said ribbon with a minimum torque and said ribbon to be kept taut during the transferring thereof, said means comprising a constant voltage generator supplying the other of the two motors and a constant current generator supplying said one motor.

2. An arrangement according to claim 1, further comprising transmission means disposed between said first motor and said feed spool for transmitting a substantially nonreversible motion from said first motor to said feed spool, and switching means for simultaneously interrupting the supply of said first and second motor.

3. An arrangement according to claim 2, wherein said switching means comprises a switching transistor having its emitter-collector circuit disposed in series with said first motor and its base receptive of a corresponding switching signal for controlling same, said constant current generator comprising a command transistor controlled by said switching transistor.

4. An arrangement according to claim 1, wherein said first motor and said voltage generator each have a first terminal and a second terminal, said terminals being connected to form a parallel circuit between said first motor and said voltage generator, and wherein said parallel circuit is connected in series with said second motor and with said current generator.

5. An arrangement according to claim 4, wherein said constant voltage generator comprises a Zener diode.

6. An arrangement according to claim 5, further comprising a switching device disposed in parallel with said Zener diode for shortcircuiting said Zener diode simultaneously with the interruption of the supply to said motors.

7. An arrangement according to claim 6, further comprising a diode disposed in parallel with said second motor and to define the return circuit for the current of said second motor when the supply thereto is interrupted.

8. An arrangement according to claim 1, wherein said motors are of the reversible type, and further comprising reversing means for controlling said motors to alternately effect the two motors to reverse functions.

9. An arrangement according to claim 8, wherein said constant voltage generator has a first and a second terminal and wherein said two motors have a terminal common therebetween connected to said first terminal of the voltage generator, said reversing means comprising a shunt return circuit connecting said second terminal of the voltage generator selectively to the other terminal of one or the other of said two motors.

10. An arrangement according to claim 9, wherein said other terminal of each of said two motors is connected to a corresponding constant current generator, said reversing means further comprising a pair of switches arranged selectively to enable one or the other of said current generators.

11. An arrangement according to claim 10, wherein each current generator and the switch associated therewith comprise a corresponding transistor of a pair of command transistors and a pair of switching transistors for the control of said command transistors.

12. An arrangement for transferring a ribbon from a feed spool to a take-up spool and disposed in an office machine having a platen and a printing head movable parallel to said platen from a rest position and from said work positions to said rest position, said arrangement comprising a first and second direct current electric motor connected to said feed spool and to said take-up spool, respectively, for effecting the rotation thereof, means for both causing one of said motors to wind-up said ribbon with a minimum torque and said ribbon to be kept taut during the transferring thereof, said means comprising a constant voltage generator supplying the other of said motors and a constant current generator supplying said one motor, and energising means which energises said two motors for a predetermined time during the movement of said head from said work positions to said rest position.

13. An arrangement according to claim 12, further comprising transmission means disposed between said first motor and said feed spool for transmitting a substantially non-reversible motion from said first motor to said feed spool, and switching means for simultaneously interrupting the supply of said first and second motor, said switching means comprising a switching transistor having its emitter-collector circuit disposed in series with said first motor and its base receptive of a corresponding switching signal for controlling same, said constant current generator comprising a command transistor controlled by said switching transistor, and said energising means comprising a pulse forming circuit which supplies said switching signal.

14. An arrangement according to claim 13, wherein said motors are of the reversible type, and further comprising reversing means for controlling said motors to alternately effect the two motors to reverse functions.

15. An arrangement according to both claim 13, further comprising a pair of sensing means to sense the amount of ribbon wound on said spools and a corresponding pair of electronic gates controlled by the sensing means for alternately enabling one or the other of said switching transistors.

* * * * *